(12) United States Patent
Hertog

(10) Patent No.: US 11,383,629 B2
(45) Date of Patent: Jul. 12, 2022

(54) METHOD AND SYSTEM FOR OPERATING A TIPPER

(71) Applicant: HYVA HOLDING B.V., Alphen aan den Rijn (NL)

(72) Inventor: Maarten Hertog, Utrecht (NL)

(73) Assignee: HYVA HOLDING B.V.

( * ) Notice: Subject to any disclaimer, the term of this patent is extended or adjusted under 35 U.S.C. 154(b) by 554 days.

(21) Appl. No.: 15/696,312

(22) Filed: Sep. 6, 2017

(65) Prior Publication Data

US 2018/0065533 A1 Mar. 8, 2018

(30) Foreign Application Priority Data

Sep. 6, 2016 (GB) ...................................... 1615147

(51) Int. Cl.
| | | |
|---|---|---|
| *B60Q 9/00* | (2006.01) | |
| *B60P 1/16* | (2006.01) | |
| *B60P 1/28* | (2006.01) | |
| *B60P 1/04* | (2006.01) | |
| *B60Q 5/00* | (2006.01) | |

(52) U.S. Cl.
CPC ............... *B60P 1/283* (2013.01); *B60P 1/045* (2013.01); *B60P 1/16* (2013.01); *B60Q 9/00* (2013.01); *B60P 1/162* (2013.01); *B60Q 5/005* (2013.01)

(58) Field of Classification Search
CPC ......... B60P 1/283; B60P 1/4464; B60P 1/162; B60P 1/04; B60P 1/16; B60P 1/045; B60P 1/34; B60Q 5/005; B60Q 9/00
See application file for complete search history.

(56) References Cited

U.S. PATENT DOCUMENTS

| | | | |
|---|---|---|---|
| 4,341,423 A | 7/1982 | Fachini et al. | |
| 7,918,638 B1* | 4/2011 | Loggins | B60P 1/283 298/1 B |
| 2008/0238180 A1* | 10/2008 | Kraenzle | B60P 1/30 298/11 |
| 2013/0035828 A1* | 2/2013 | Tamura | F15B 11/044 701/50 |
| 2013/0240226 A1* | 9/2013 | Simpson | E02F 3/844 172/822 |

(Continued)

FOREIGN PATENT DOCUMENTS

| | | |
|---|---|---|
| DE | 4414209 A | 10/1995 |
| EP | 2172364 A2 | 4/2010 |

(Continued)

OTHER PUBLICATIONS

European Search Report in European Patent No. 17188910.8, dated Jan. 24, 2018, 8 pages.

(Continued)

*Primary Examiner* — Mathew Franklin Gordon

(57) ABSTRACT

A system for and method of operating a tipper comprising a tipper body pivotably movable with respect to a frame with a hydraulic cylinder disposed therebetween and actuatable to pivot the tipper body. A loading parameter relating to the load through the hydraulic cylinder is monitored during tipping. Based on at least the loading parameter, it is determined whether the hydraulic cylinder is at risk of buckling and, if it is determined that the hydraulic cylinder is at risk of buckling, an output is generated in response.

19 Claims, 5 Drawing Sheets

(56) References Cited

U.S. PATENT DOCUMENTS

2016/0272101 A1* 9/2016 Vitale ...................... B60P 1/16
2018/0347479 A1* 12/2018 Nakamura ............ F02D 41/021

FOREIGN PATENT DOCUMENTS

| | | |
|---|---|---|
| EP | 2364877 A1 | 9/2011 |
| EP | 2570301 A | 3/2013 |
| EP | 3064397 A1 | 9/2016 |
| GB | 981323 A | 1/1965 |
| JP | 2006347502 A * | 12/2006 |
| WO | 8702128 A1 | 4/1987 |

OTHER PUBLICATIONS

Search Report for application No. GB1615147.4 filed Sep. 6, 2016 (3 pages).

* cited by examiner

METHOD AND SYSTEM FOR OPERATING A TIPPER

FIELD

The invention relates to a method and system for operating a tipper. In particular, the invention relates to a method and system in which it is determined whether the hydraulic cylinder of the tipper is at risk of buckling.

BACKGROUND

A tipper truck, sometimes referred to as a dump or dumper truck or dump truck, is a vehicle that is typically used in the construction industry for transporting aggregate (e.g. gravel or sand). The tipper typically comprises an engine, a driver cab and a trailer. The trailer usually has a trailer chassis or frame with a tipper body, in the form of an open-top cuboidal container, pivotably mounted thereto. A hydraulic cylinder is provided between the frame and the tipper body and can be extended to pivot the tipper body to a tipping position in which the load is emptied from the body. The cylinder can be retracted to lower the tipper body. It should be appreciated that this is merely one form of tipper truck and other types also exist.

If during a tipping operation the axial load through the hydraulic cylinder is too great then the hydraulic cylinder may buckle. This is may be undesirable as it may damage the hydraulic cylinder and it may present a serious safety hazard. In order to prevent buckling of a hydraulic cylinder it is known to limit the working pressure of the cylinder to ensure that it can never lift more than its own column strength (plus a safety factor). This sometimes results in hydraulic cylinders being "oversized" for a particular application in order to ensure that it can lift the required load whilst ensuring that it will not buckle. However, selecting an oversized cylinder frequently means that the tipping cycle is too slow, the cylinder is too heavy, and a large oil tank is required.

SUMMARY

Some embodiments include a method of operating a tipper, the tipper comprising a tipper body pivotably movable with respect to a frame with a hydraulic cylinder disposed therebetween and actuatable to pivot the tipper body, the method comprising: commencing a tipping operation in which the tipper body is pivoted towards a tipped position; and during at least a phase of the tipping operation: (i) monitoring a loading parameter relating to the load through the hydraulic cylinder; (ii) determining that the hydraulic cylinder is at risk of buckling based on at least the loading parameter; and (iii) generating an output in response to determining that the hydraulic cylinder is at risk of buckling. The output could be any one of a number of suitable outputs such as an audible or visual alert, or the tipping operation could be stopped, halted or prevented. This may prevent the hydraulic cylinder from buckling during a tipping operation, thereby providing a significant safety advantage.

In some embodiments, the "loading parameter" may be any suitable parameter relating to the load through the hydraulic cylinder. The loading parameter may be an axial loading parameter relating to the axial load through the hydraulic cylinder.

In some embodiments, the axial loading parameter may be a pressure parameter relating to the hydraulic pressure within the hydraulic cylinder. The pressure parameter may be generated by a pressure sensor which measures the hydraulic pressure within the hydraulic cylinder. The pressure sensor may be mounted to the hydraulic cylinder.

In some embodiments, the loading parameter could be generated by one or more load cells. For example, the load cell(s) could be mounted on the trunnions mounting the hydraulic cylinder to the frame and/or tipper body, or they could be attached to the brackets to which the hydraulic cylinder is attached. In yet another arrangement, one or more strain gauges could be used to generate a loading parameter relating to the load through the hydraulic cylinder. In yet a further arrangement a bending sensor could be used to monitor and/or measure the bending of the hydraulic cylinder, and a bending parameter could be monitored (which relates to the load through the cylinder). The bending sensor could be a strain gauge, for example. Of course, it should be appreciated that other suitable sensors or parameters could be used and/or monitored.

In some embodiments, it may be determined that the hydraulic cylinder is at risk of buckling when at least the loading parameter exceeds a buckling threshold. The buckling threshold may be a threshold loading parameter and may relate to a threshold load, such as an axial load, through the hydraulic cylinder. The buckling threshold may be a predetermined buckling threshold. In other words, the buckling threshold may be preset for the particular set-up (e.g. it may be preset for the specific hydraulic cylinder). In other arrangements the buckling threshold may vary, for example, it may depend on the length of the hydraulic cylinder. The buckling threshold may decrease as the length of the hydraulic cylinder increases.

In some embodiments, the method may further comprise determining that the length of the hydraulic cylinder is above a threshold length. It may be determined that the hydraulic cylinder is at risk of buckling based on at least (a) determining that the length of the hydraulic cylinder is above a threshold length and (b) the loading parameter. In one arrangement, the loading parameter is not actively monitored until it has been determined that the length of the hydraulic cylinder is above a threshold length, and once it has been determined that the length of the hydraulic cylinder is above a threshold the loading parameter is monitored to check if the cylinder is at risk of buckling (e.g. whether or not the loading parameter exceeds a threshold).

In some embodiments, the hydraulic cylinder may be a multi-stage hydraulic cylinder (e.g. a telescopic hydraulic cylinder). It may be determined that the length of the hydraulic cylinder is above a threshold length when it is determined that the hydraulic cylinder is in the final stage of extension. Thus, the actual length may not be determined. Instead, it may simply be determined that the last stage of the cylinder is extending. This may be done using any suitable method. For example, this could be determined using a Hall effect sensor, or the pressure within the hydraulic cylinder could be monitored and it could be determined that the cylinder is in the final stage of extension when the final pressure step change occurs.

In some embodiments, the method may further comprise monitoring a length parameter relating to the length of the hydraulic cylinder. It may be determined that the length of the hydraulic cylinder is above a threshold length based on at least the length parameter. The length parameter may be generated by an inclination sensor. The inclination sensor may measure the inclination of the tipper body. The inclination of the tipper body will have a fixed relationship to the length of the cylinder and therefore can be related to the length of the hydraulic cylinder. The length of the hydraulic cylinder can therefore be derived from the inclination of the tipper body. The inclination sensor may be mounted to the tipper body. The inclination sensor may measure the inclination of the hydraulic cylinder. The inclination sensor may be mounted to the hydraulic cylinder. Again, the length of the cylinder can be derived from the inclination of the hydraulic cylinder. Other sensors could be used to generate a length parameter and/or determine the length of the hydraulic cylinder. For example, the length parameter could be generated by a rotary position sensor arranged to measure the angular position of the tipper body about the pivot axis of the tipper body and/or the angular position of the hydraulic cylinder about a pivot axis of the hydraulic cylinder. Due to the fixed geometry, the length of the hydraulic cylinder can be derived from either the angular position of the hydraulic cylinder or the angular position of the tipper body. The inclination could be measured relative to the earth or relative to the vehicle. In some embodiments, the inclination could be measured relative to the earth and corrected for any inclination of the vehicle itself.

In some embodiments, generating an output may comprise generating an alert in response to determining that the hydraulic cylinder is at risk of buckling. The alert may comprise a visual and/or an audible alert. The method may further comprise preventing a tipping operation from being performed (or preventing further extension of the hydraulic cylinder) in response to determining that the hydraulic cylinder is at risk of buckling. The method may further comprise automatically halting (i.e. stopping) a tipping operation in response to determining that the hydraulic cylinder is at risk of buckling. The method may further comprise automatically lowering the tipper body (e.g. lowering or returning it to a resting position) in response to determining that the hydraulic cylinder is at risk of buckling.

In some embodiments, it should be appreciated that the order of the method steps presented throughout this document is not limiting and they may be performed in any suitable order.

According to some embodiments, there is provided a system for a tipper comprising a tipper body pivotably movable with respect to a frame with a hydraulic cylinder disposed therebetween and actuatable to pivot the tipper body, the system comprising: a hydraulic cylinder load monitoring module arranged to monitor a loading parameter relating to the load through the hydraulic cylinder during a tipping operation; a buckling risk determining module arranged to: determine whether the hydraulic cylinder is at risk of buckling based on at least the loading parameter; and generate an output if it is determined that the hydraulic cylinder is at risk of buckling.

In some embodiments, the loading parameter may be an axial loading parameter relating to the axial load through the hydraulic cylinder. The axial loading parameter may be a pressure parameter relating to the hydraulic pressure within the hydraulic cylinder. The system may further comprise a pressure sensor arranged to measure the hydraulic pressure within the hydraulic and arranged to generate the pressure parameter. The pressure sensor may be arranged to be mounted to the hydraulic cylinder.

In some embodiments, the buckling risk determining module may be arranged to determine that the hydraulic cylinder is at risk of buckling when at least the loading parameter exceeds a buckling threshold. The buckling threshold may be a predetermined buckling threshold.

In some embodiments, the system may further comprise a cylinder length determining module arranged to determine whether the length of the hydraulic cylinder is above a threshold length; and wherein the buckling risk determining module is arranged to determine that the hydraulic cylinder is at risk of buckling when (a) it is determined that the length of the hydraulic cylinder is above a threshold length and (b) based on at least the loading parameter.

In some embodiments, the hydraulic cylinder may be a multi-stage hydraulic cylinder. The cylinder length determining module may be arranged to determine that the length of the hydraulic cylinder is above a threshold length when it is determined that the hydraulic cylinder is in the final stage of extension. The cylinder length determining module may be arranged to monitor a length parameter relating to the length of the hydraulic cylinder and may be arranged to determine whether the length of the hydraulic cylinder is above a threshold length based on at least the inclination parameter. The system may further comprise an inclination sensor arranged to generate the length parameter. The inclination sensor may be arranged to measure the inclination of the tipper body. The inclination sensor may be mounted to the tipper body. The inclination sensor may be arranged to measure the inclination of the hydraulic cylinder. The inclination sensor may be arranged to be mounted to the hydraulic cylinder.

In some embodiments, the system may further comprise an alert generator arranged to generate an alert if it is determined that the hydraulic cylinder is at risk of buckling. The alert generator comprises a visual and/or an audible alert generator. The alert may be cancelled if the buckling determining module determines that there is no longer a risk of buckling.

In some embodiments, the system may further comprise a cylinder control module arranged to prevent a tipping operation from being performed if it is determined that the hydraulic cylinder is at risk of buckling. The system may further comprise a cylinder control module arranged to automatically halt a tipping operation in response to determining that the hydraulic cylinder is at risk of buckling. The system may further comprise a cylinder control module arranged to automatically lower the tipper body in response to determining that the hydraulic cylinder is at risk of buckling.

In some embodiments, the invention also relates to a tipper comprising: a tipper body pivotably movable with respect to a frame; a hydraulic cylinder disposed between the frame and the tipper body and actuatable to pivot the tipper body; and a system in accordance with any statement herein. The pressure sensor may be mounted to the hydraulic cylinder. The inclination sensor may be mounted to the tipper body. The inclination sensor may be mounted to the hydraulic cylinder. There is also provided a tipper vehicle in accordance with any statement herein.

In some embodiments may comprise any combination of the features and/or limitations referred to herein, except combinations of such features as are mutually exclusive.

BRIEF DESCRIPTION OF THE FIGURES

Embodiments of the invention will now be described, by way of example, with reference to the accompanying drawings, in which.

DETAILED DESCRIPTION

Figure 1:
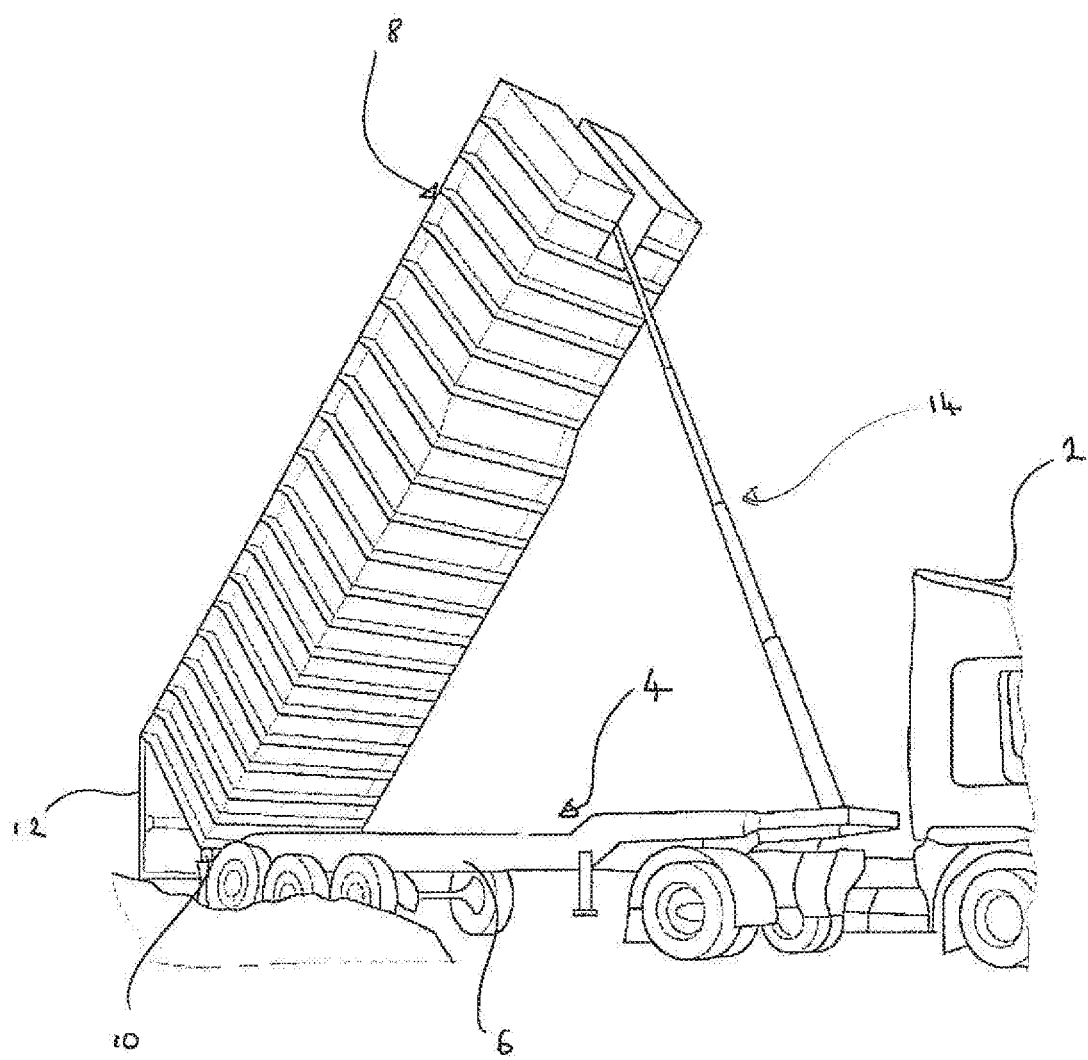
FIG. 1 schematically shows a perspective view of a tipper truck.
Figure 2:
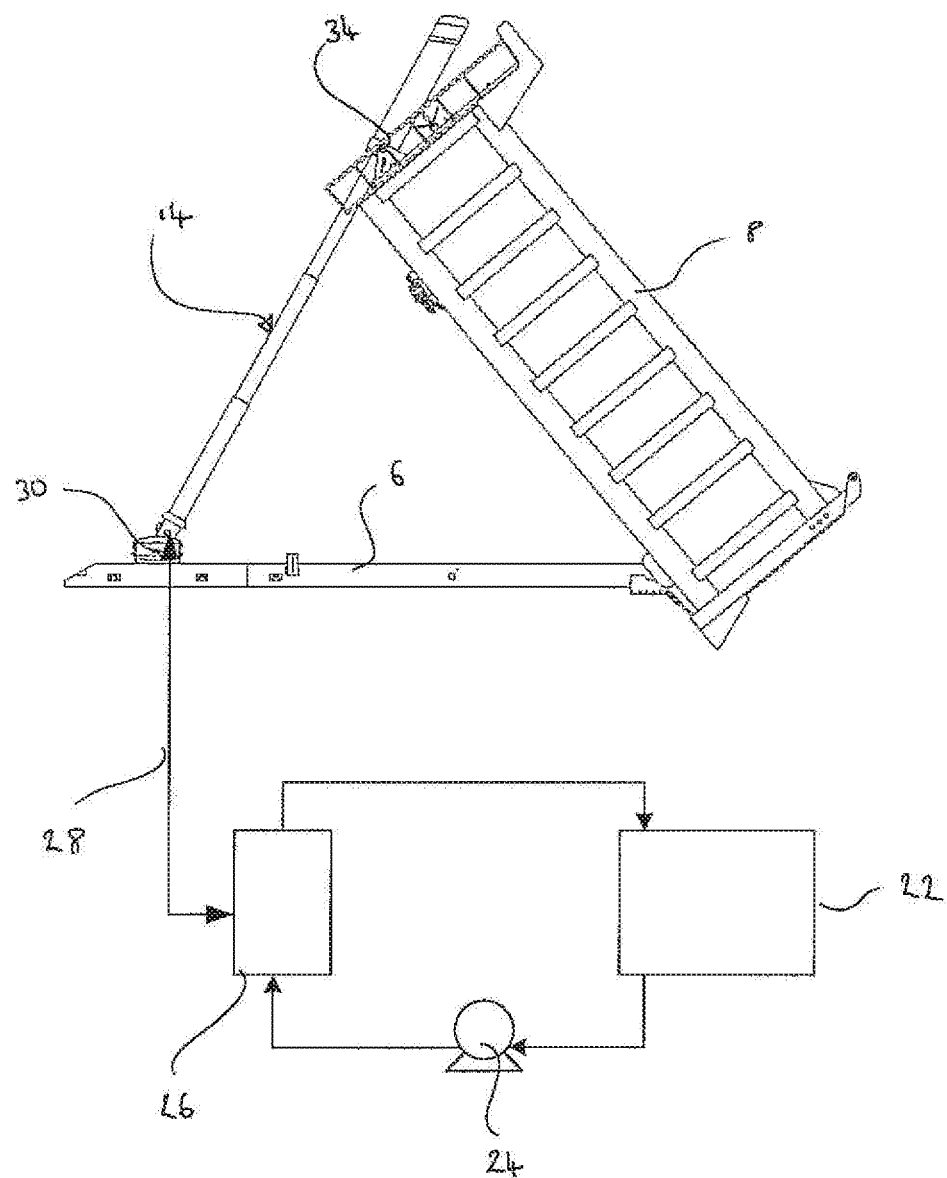
FIG. 2 schematically shows a side view of the tipper truck of FIG. 1 without the tractor.

FIGS. 1 and 2 show a tipper truck 1, sometimes referred to as a dump truck, comprising a tractor 2 and a trailer 4. The trailer 4 has a trailer chassis or frame 6, and a tipper body 8 is pivotably mounted thereto. The tipper body 8 is pivotably mounted to the chassis 6 about a transverse axis 10 that is located at the rear of the chassis 6. The tipper body 8 is in the form of a cuboidal container having an open top. The rear panel (or door) 12 of the tipper body 8 is hinged at its upper edge and can be locked and unlocked such that it can be opened to allow the contents of the tipper body 8 to be emptied. A multi-stage telescopic hydraulic cylinder 14 is provided that is pivotably attached at a lower end to the front of the chassis 6 and pivotably attached at an upper end to the front of the tipper body 8. The hydraulic cylinder 14 can be extended (as in FIG. 1) to pivot the tipper body 8 about the axis 10 to a fully tipped position in which, with the rear panel 12 unlocked, any load within the tipper body 8 is emptied onto the ground. The cylinder 14 can be retracted so as to pivot the tipper body 8 back to a resting position in which it rests on the chassis 6.

The tipper truck 1 further comprises a hydraulic actuation system 20 for actuating the hydraulic cylinder 14. The hydraulic actuation system 20 comprises an oil tank 22, a pump 24 and a valve assembly 26 that are connected with fluid lines to form a fluid circuit. A pilot system (not shown) is also provided for switching the valve assembly 26 between various configurations. The valve assembly 26 is provided with a port that is hydraulically connected to the hydraulic cylinder 14 with a fluid line 28. The valve assembly 26 can be switched between a number of configurations in order to operate the hydraulic cylinder 14. In a bypass configuration of the valve assembly 26, with the pump 24 running, hydraulic fluid is circulated by the pump 24 from the tank 22, through the valve assembly 26 back to the tank 22. In order to extend the hydraulic cylinder 14 to pivot the tipper body 8 to a fully tipped position (as in FIGS. 1 and 2), the valve assembly 26 is switched to a raising configuration in which the pump 24 pumps hydraulic fluid from the tank 22 into the hydraulic cylinder 14, thus causing it to extend. When the hydraulic cylinder 14 has been sufficiently extended (either fully extended or extended by the desired amount), the valve assembly 26 is returned to a bypass configuration in which, with the pump 24 running, hydraulic fluid is circulated from the tank 22 through the valve assembly 26 back to the tank 22. In the bypass configuration of the valve assembly 26 the fluid line 28 is closed and therefore the cylinder 14 remains in the extended configuration. In this embodiment, the hydraulic actuation system 20 is provided with an automatic knock-off which automatically switches the valve assembly 26 to the bypass configuration when the hydraulic cylinder has been fully extended. The automatic knock-off is in the form of a switch which the body of the hydraulic cylinder 14 triggers when it reaches the fully extended position. The valve assembly 26 may also be provided with a pressure relief bypass valve. If the pressure of the hydraulic fluid in the valve assembly 26 has reached a threshold (which may be due to an excessively heavy load in the tipper body 8) the hydraulic fluid is diverted to the tank 22, rather than being pumped into the hydraulic cylinder 14. This is a safety feature that may be provided to prevent excessively heavy loads from being lifted. In order to lower the hydraulic cylinder 14, the pump 24 is shut off and the valve assembly 26 is switched to a lowering configuration. In this configuration, the fluid line 28 is opened and the cylinder 14 retracts under the weight of the tipper body 8 with the hydraulic fluid being returned to the tank 22.

If the load within the tipper body 8 is excessive and/or the hydraulic cylinder 14 is too small then during a tipping operation there may be a risk of the hydraulic cylinder 14 buckling (i.e. the critical column strength may be exceeded). As will be described in greater detail below, the tipper truck 1 is provided with a buckling warning system 40 which generates an alert if the hydraulic cylinder 14 is at risk of buckling.

Figure 3:
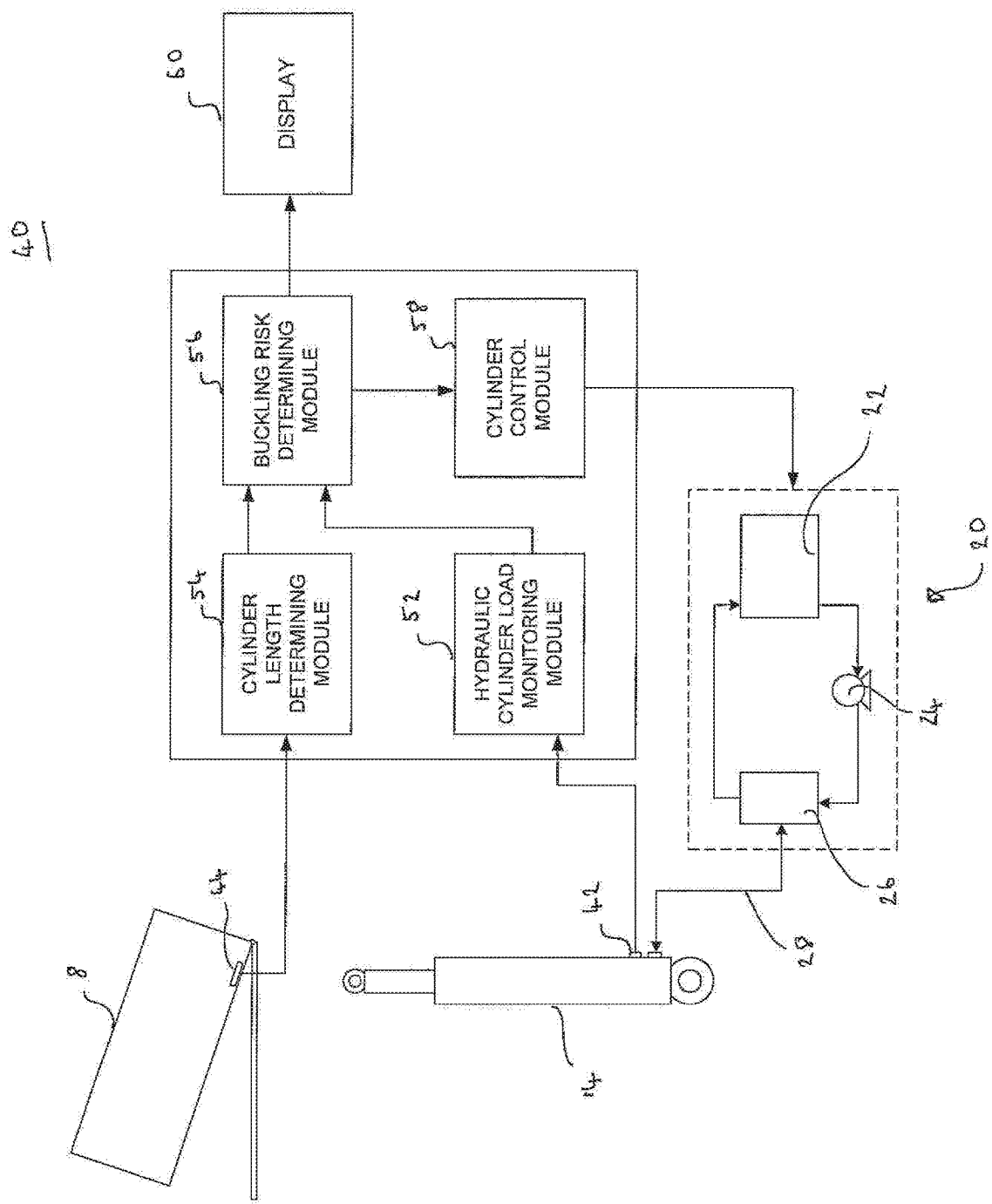
FIG. 3 schematically shows a buckling warning system.

FIG. 3 shows the buckling warning system 40 for generating a warning that the hydraulic cylinder 14 is at risk of buckling. The buckling warning system 40 comprises a pressure sensor 42 for measuring the pressure of the hydraulic fluid, such as oil, within the hydraulic cylinder 14 and an inclination (or tilt) sensor 44 for measuring the inclination (i.e. the tilt angle) of the tipper body 8 about the pivot axis 10. The pressure sensor 42 is an electronic pressure transducer that is installed within a port provided in the outer wall of the cylinder 14. The pressure sensor 42 is thus fixed to the hydraulic cylinder 14 and is exposed to the hydraulic fluid within the cylinder 14. The pressure sensor 42 is arranged to generate an electronic signal which is representative of the detected hydraulic pressure (i.e. the pressure of the hydraulic fluid). Thus, the hydraulic pressure within the cylinder 14 can be determined from the electronic signal generated by the pressure sensor 42. The pressure within the hydraulic cylinder 14 also relates to the axial load through the hydraulic cylinder 14. Therefore, the electronic signal generated by the pressure sensor can be considered to be a load parameter relating to the load through the hydraulic cylinder 14. The inclination sensor 44 is mounted to the tipper body 8 and is positioned such that it can measure the inclination of the tipper body 8 about the pivot axis 10. With the truck chassis 6 horizontal, the tip angle θ of the tipper body 8 can be determined from the electronic signal generated by the inclination sensor 44. Due to the relationship between the hydraulic cylinder 14 and the tipper body 8, the electronic signal generated by the inclination sensor 44 also relates to the inclination angle α of the hydraulic cylinder 14 and the length L of the hydraulic cylinder 14 (i.e. with the truck chassis 6 horizontal the inclination angle α and the length of the cylinder L can be determined from the electronic signal generated by the inclination sensor 44). The signal generated by the inclination sensor 44 can therefore be considered to be a length parameter since it can be related to the length of the cylinder 14.

The buckling warning system 40 further comprises a hydraulic cylinder load determining module 52, a cylinder length determining module 54, a buckling risk determining module 56, a cylinder control module 58 and a display 60. The pressure sensor 42 is connected to the hydraulic cylinder load determining module 52 and the inclination sensor 44 is connected to the cylinder length determining module 54 by appropriate cabling such that the modules 52, 54 can receive the electronic signals generated by the sensors 42, 44. In particular, the hydraulic cylinder monitoring module 52 is arranged to receive from the pressure sensor 42 the loading parameter relating to the load through the hydraulic cylinder 14, and the cylinder length determining module 54 is arranged to receive from the inclination sensor 44 the length parameter relating to the length of the hydraulic cylinder 14. It should be appreciated that in other embodiments the sensors 42, 44 could be wirelessly connected to the respective modules 52, 54.

Figure 4:
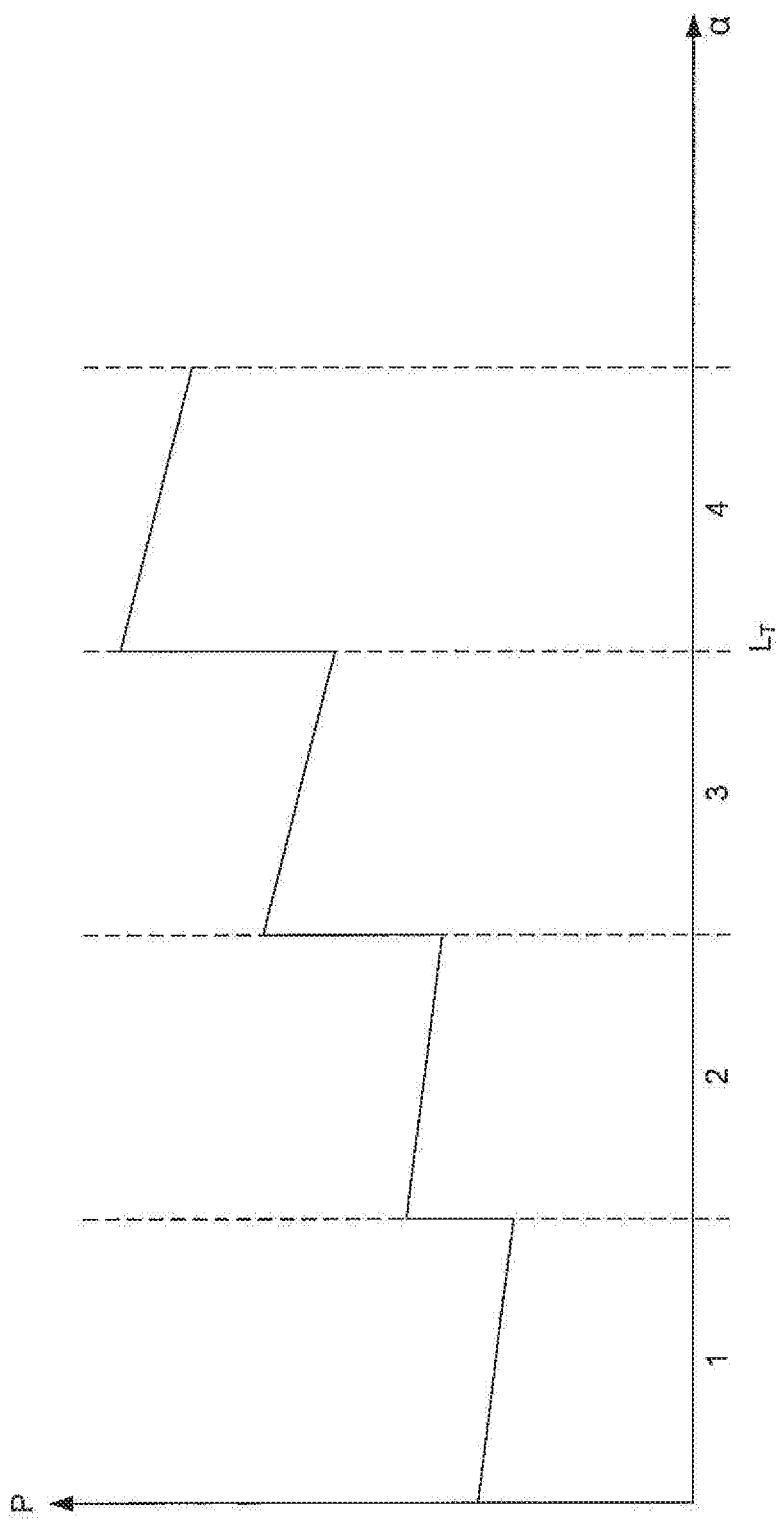
FIG. 4 schematically shows a graph showing pressure as a function of cylinder inclination angle.

The buckling determining module 56 is connected to the hydraulic cylinder load monitoring module 52 and receives the monitored pressure signal (otherwise known as the loading parameter) which relates to the axial load through the hydraulic cylinder 14. The cylinder length determining module 54 is configured to determine from the signal generated by the inclination sensor 44 whether the multi-stage telescopic hydraulic cylinder 14 is in the final stage of extension. This can be achieved by setting a threshold inclination value relating to a threshold length of hydraulic cylinder which is the length of the cylinder just prior to it entering the final stage of extension. The cylinder length determining module 54 is configured to determine that the cylinder is above a threshold length (and is in the final stage of extension) when the length parameter (i.e. the output of the inclination sensor 44) exceeds the threshold inclination value. The buckling determining module 56 is connected to the cylinder length determining module 54 and receives a signal from the cylinder length determining module 54 when it is determined that the cylinder 14 is in the final stage of extension. It should be appreciated that it could be determined that the cylinder is above a threshold length and/or in the final stage of extension by monitoring other parameters. For example, a Hall effect sensor could be used to determine when the cylinder has reached a certain length. In another arrangement the pressure within the hydraulic cylinder 14 could be monitored and it could be determined that the cylinder is in the final stage of extension when the final step change in pressure occurs. FIG. 4 shows a graph representing the hydraulic pressure P within a four-stage telescopic hydraulic cylinder as the inclination angle $\alpha$ increases (wherein $\alpha=0$ when the tipper body 8 is in the resting position). As shown in FIG. 4, there are pressure step increases which correspond to the next stage extending. Therefore, for a four-stage hydraulic cylinder, it can be determined that the cylinder has entered the final stage of extension when the third pressure step change occurs. This may correspond to the threshold length LT.

The buckling determining module 56 is configured so that when the cylinder is in the final stage of extension (i.e. when it is over a threshold length) it is configured to determine whether the hydraulic cylinder 14 is at risk of buckling. The buckling determining module 56 is configured to determine that the hydraulic cylinder 14 is at risk of buckling if the value of the pressure signal monitored (i.e. the value of the loading parameter) exceeds a preset buckling threshold. The buckling threshold is defined based on the critical load of the hydraulic cylinder (using the Euler column formula) plus a safety factor. If the buckling threshold is exceeded then this indicates that the hydraulic cylinder is at risk of buckling. In this arrangement the buckling threshold is fixed for the particular set-up. However, in other arrangements the buckling threshold could be calculated based on the current length of the hydraulic cylinder.

The cylinder control module 58 is coupled to the hydraulic actuation system 20 of the tipper truck 1 (via the pilot system) so that it can automatically halt a tipping operation and actuate the hydraulic cylinder 14 to return the tipper body 8 to a resting position if the buckling determining module 56 determines that the hydraulic cylinder 14 is at risk of buckling. The display 60 is connected to the buckling determining module 56 and is configured to display an alert if the buckling determining module 56 determines that the hydraulic cylinder 14 is at risk of buckling. The display 60 is an LCD screen configured to display a visual alert, and a sounder is also provided to generate an audible alert. In this embodiment the display 60 is installed in the dashboard of the tractor 2 such that it is easily visible by an operator. However, in other embodiments it could be located externally, or it could be in the form of a wireless hand-held device (e.g. a smartphone or a tablet). If the display 60 is provided by a portable wireless device, such as a smartphone or tablet, it could also incorporate the various modules 52, 54, 56, 58 and could communicate wirelessly with the sensors 42, 44. It should be appreciated that other displays, such as one or more LEDs could be used to provide a warning.

The operation of the tipper 1 will now be described.

Before commencing a tipping operation the tipper truck 1 is driven to a location where the chassis 6 is substantially horizontal. Initially, the tipper body 8 containing a load 16 (such as sand) is in a resting position. In the resting position of the tipper body 8 it rests on the chassis 6 of the trailer 4 such that the load is transferred directly to the chassis 6. Therefore, in the resting position no load is transferred through the hydraulic cylinder 14. In order to commence a tipping operation in which the load 16 within the tipper body 8 is emptied, an operator uses a control lever (not shown) of the hydraulic actuation system 20 to extend the multi-stage telescopic hydraulic cylinder 14. This causes the tipper body 8 to be pivoted about the axis 10 from the resting position towards a fully tipped position. The hydraulic cylinder 14 is extended in order to pivot the tipper body 8 to a fully tipped position and the individual stages of the cylinder are progressively extended one-by-one.

With reference to FIG. 4, as soon as the tipper body 8 is pivoted away from the chassis 6 the load is transferred through the hydraulic cylinder 14 which pressurises the hydraulic fluid within the cylinder 14. As the inclination angle $\alpha$ of the cylinder increases (i.e. as the tipper body 8 is pivoted away from the chassis) the pressure gradually reduces as the axial load through the cylinder decreases. However, the pressure within the hydraulic cylinder 14 exhibits a step change increase corresponding to the next stage of the hydraulic cylinder 14 starting to extend.

The hydraulic cylinder load monitoring module 52 continuously monitors the value of the pressure signal generated by the pressure sensor 42 and the cylinder length determining module 54 continuously monitors the value of the inclination signal generated by the inclination sensor 44. The inclination sensor 44 monitors the inclination angle of the tipper body 8, but due to the relationship between the cylinder 14 and the tipper body 8, it also relates to the length L of the hydraulic cylinder 14. The cylinder length determining module 54 determines whether or not the hydraulic cylinder 14 is in the final stage of extension by determining whether the value of the inclination signal exceeds a threshold. The threshold corresponds to the value of the inclination signal when the final stage of the cylinder 14 starts to extend. When the cylinder length determining module 52 has determined that the hydraulic cylinder 14 has entered the final stage of extension the buckling risk determining module 56 determines whether the load (which may be the axial load) through the hydraulic cylinder 14, as represented by the pressure signal, is indicative of the hydraulic cylinder 14 being at risk of buckling. In this embodiment, this is done by comparing the value of the pressure signal generated by the pressure sensor 42 with a predetermined buckling threshold. As explained above, the buckling threshold is based on the pressure within the cylinder which corresponds to the critical load plus a safety factor.

If it is determined that the current hydraulic cylinder is at risk of buckling, the display 60 generates a visual alert and an audible alert is also generated. This alerts the operator to the potential risk of cylinder buckling. Further, in this arrangement, in response to determining that the hydraulic cylinder is at risk of buckling, the cylinder control module 58 communicates with the hydraulic actuation system 20 to automatically actuate the hydraulic cylinder 14 to halt the tipping operation, prevent any further tipping, and return the tipper body 8 to the resting position. Returning the tipper body 8 to the resting position minimises any risk of the cylinder 14 buckling. As soon as it is determined that there is no longer a risk of buckling, any alert is cancelled and tipping is once again permitted.

The provision of a buckling warning system 40 allows smaller, lighter hydraulic cylinders to be used for a particular working pressure, whilst still minimising the risk of the cylinder buckling. This may also result in the tipping cycle time being reduced.

It has been described above that if the buckling risk determining module 56 determines that the cylinder 14 is at risk of buckling then the tipping operation is stopped (i.e. movement of the tipper body 8 is halted), the tipper body 8 is returned to a resting position, and an alert is generated. However, in other embodiments only an alert is generated. Alternatively, in another embodiment movement of the tipper body 8 could be stopped, and the operator may need to manually lower the tipper body.

In the embodiment described above a pressure sensor 42 measuring the hydraulic pressure within the cylinder 14 is used as a load parameter which relates to the axial load through the hydraulic cylinder 14. However, other sensors such as load cells or strain gauges attached to appropriate components of the tipper could be used to generate a load parameter which relates to the load through the hydraulic cylinder 14. Further, if a pressure sensor is used then this could be installed in any suitable location in the hydraulic circuit so as to measure the pressure within the cylinder.

It has been described that the inclination sensor 44 generates a signal representative of the length of the hydraulic cylinder 14 and that this can be related to the cylinder length L. However, other suitable sensors and/or methods could be used to determine that the length of the cylinder is above a threshold. Further, in some embodiments the length of the cylinder may not be monitored or calculated and the loading parameter relating to the load through the hydraulic cylinder 14 could be continuously monitored to determine if there is a risk of buckling.

The system and method can be used with any suitable hydraulic cylinder, either single stage or multi-stage (telescoping). However, it should be appreciated that the buckling threshold may be different for each cylinder depending on, amongst other things, the slenderness of the hydraulic cylinder.

Figure 5:
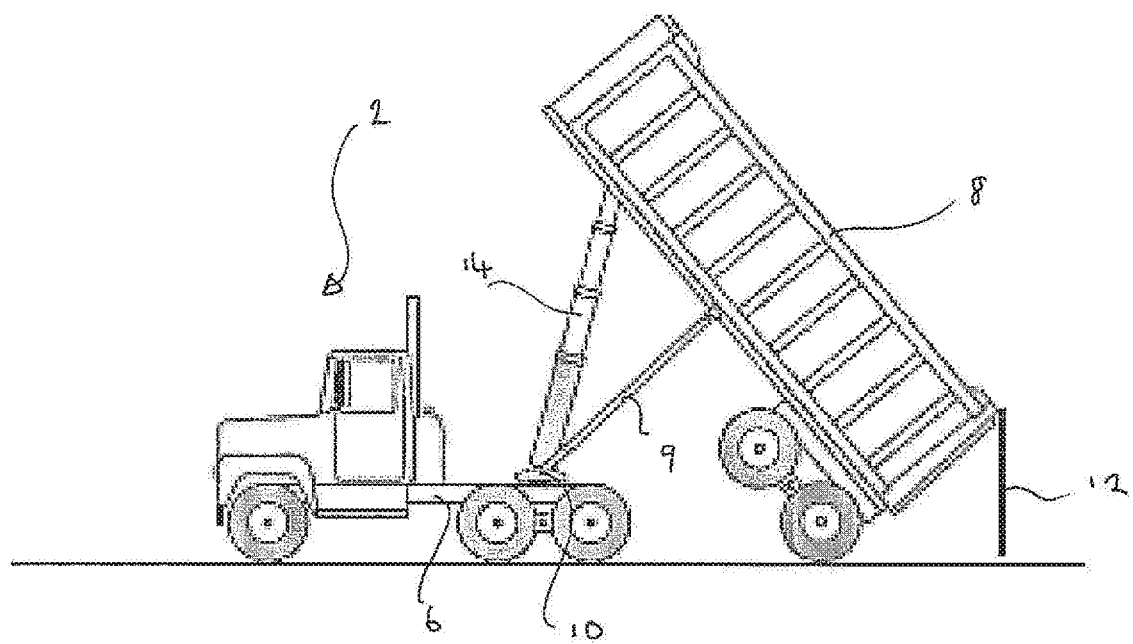
FIGS. 5 and 6 show alternative tipper trucks.
Figure 6:
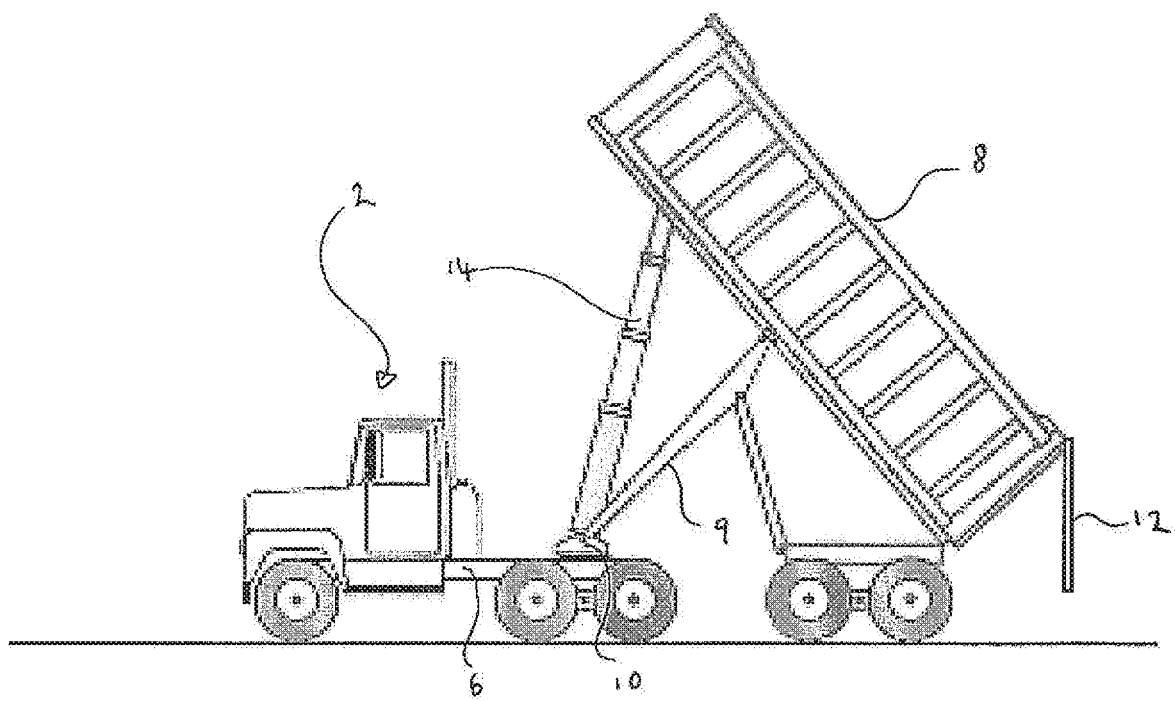

It should be appreciated that the system could be used with any suitable type of tipper truck in which a tipper body 8 can be pivoted or moved by a hydraulic cylinder. For example, as shown in FIGS. 5 and 6, the tipper truck 1 may comprises a tractor 2 having a frame 6 with a hydraulic cylinder 14 connected between the frame 6 and the tipper body 8. The tipper truck 14 further comprises a drawbar 9 that is pivotably connected at a first end to the frame 6 at a first pivot axis 10 and at a second end to the tipper body 8 at a second pivot axis. In order to pivot the tipper body 8 from a resting position (not shown) to the fully tipped position, the hydraulic cylinder 14 is extended which causes the tipper body 8 to pivot clockwise with respect to the frame 6 and the drawbar 9. It should also be appreciated that in order to monitor the length the hydraulic cylinder 14, the inclination angle of the drawbar 9 could be measured since there is a fixed relationship between this angle and the hydraulic cylinder 14 length.

The buckling warning system 40 may be one of many intelligent systems that the tipper truck 1 is provided with and could therefore be combined with any suitable system for providing information regarding the tipper vehicle and/or the load carried by the tipper body. If multiple intelligent systems are provided, they may share the same display or processors, for example.

Some aspects of the above-described apparatus, system and methods, may be embodied as machine readable instructions such as processor control code, for example on a non-volatile carrier medium such as a disk, CD- or DVD-ROM, programmed memory such as read only memory (Firmware), or on a data carrier such as an optical or electrical signal carrier. For some applications, embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). The code may be distributed between a plurality of coupled components in communication with one another. Where appropriate, embodiments may also be implemented using code running on a field-(re) programmable analogue array or similar device in order to configure analogue hardware.

For the avoidance of doubt, the present disclosure extends to the subject matter recited in the following numbered paragraphs or 'Paras':

1. A method of operating a tipper, the tipper comprising a tipper body pivotably movable with respect to a frame with a hydraulic cylinder disposed therebetween and actuatable to pivot the tipper body, the method comprising:
   commencing a tipping operation in which the tipper body is pivoted towards a tipped position; and
   during the tipping operation:
   (i) monitoring a loading parameter relating to the load through the hydraulic cylinder;
   (ii) determining that the hydraulic cylinder is at risk of buckling based on at least the loading parameter; and
   (iii) generating an output in response to determining that the hydraulic cylinder is at risk of buckling.
2. The method according to Para 1, wherein the loading parameter is an axial loading parameter relating to the axial load through the hydraulic cylinder.
3. The method according to Para 2, wherein the axial loading parameter is a pressure parameter relating to the hydraulic pressure within the hydraulic cylinder.
4. The method according to Para 3, wherein the pressure parameter is generated by a pressure sensor which measures the hydraulic pressure within the hydraulic cylinder.
5. The method according to Para 4, wherein the pressure sensor is mounted to the hydraulic cylinder.
6. The method according to any preceding Para, wherein it is determined that the hydraulic cylinder is at risk of buckling when at least the loading parameter exceeds a buckling threshold.

7. The method according to Para 6, wherein the buckling threshold is a predetermined buckling threshold.
8. The method according to any preceding Para, further comprising determining that the length of the hydraulic cylinder is above a threshold length, and wherein it is determined that the hydraulic cylinder is at risk of buckling based on at least (a) determining that the length of the hydraulic cylinder is above a threshold length and (b) the loading parameter.
9. The method according to Para 8, wherein the hydraulic cylinder is a multi-stage hydraulic cylinder, and wherein it is determined that the length of the hydraulic cylinder is above a threshold length when it is determined that the hydraulic cylinder is in the final stage of extension.
10. The method according to Para 8 or 9, further comprising monitoring a length parameter relating to the length of the hydraulic cylinder, and wherein it is determined that the length of the hydraulic cylinder is above a threshold length based on at least the length parameter.
11. The method according to Para 10, wherein the length parameter is generated by an inclination sensor which measures the inclination of the tipper body.
12. The method according to Para 11, wherein the inclination sensor is mounted to the tipper body.
13. The method according to Para 10, wherein the length parameter is generated by an inclination sensor which measures the inclination of the hydraulic cylinder.
14. The method according to Para 13, wherein the inclination sensor is mounted to the hydraulic cylinder.
15. The method according to any preceding Para, wherein (iii) comprises generating an alert in response to determining that the hydraulic cylinder is at risk of buckling.
16. The method according to Para 15, wherein the alert comprises a visual and/or an audible alert.
17. The method according to any preceding Para, wherein (iii) comprises preventing a tipping operation from being performed in response to determining that the hydraulic cylinder is at risk of buckling.
18. The method according to any preceding Para, wherein (iii) comprises automatically halting a tipping operation in response to determining that the hydraulic cylinder is at risk of buckling.
19. The method according to any preceding Para, wherein (iii) comprises automatically lowering the tipper body in response to determining that the hydraulic cylinder is at risk of buckling.
20. A system for a tipper comprising a tipper body pivotably movable with respect to a frame with a hydraulic cylinder disposed therebetween and actuatable to pivot the tipper body, the system comprising:
a hydraulic cylinder load monitoring module arranged to monitor a loading parameter relating to the load through the hydraulic cylinder during a tipping operation;
a buckling risk determining module arranged to:
determine whether the hydraulic cylinder is at risk of buckling based on at least the loading parameter; and
generate an output if it is determined that the hydraulic cylinder is at risk of buckling.
21. The system according to Para 20, wherein the loading parameter is an axial loading parameter relating to the axial load through the hydraulic cylinder.
22. The system according to Para 21, wherein the axial loading parameter is a pressure parameter relating to the hydraulic pressure within the hydraulic cylinder.
23. The system according to Para 22, further comprising a pressure sensor arranged to measure the hydraulic pressure within the hydraulic and arranged to generate the pressure parameter.
24. The system according to Para 23, wherein the pressure sensor is arranged to be mounted to the hydraulic cylinder.
25. The system according to any of Paras 20-24, wherein the buckling risk determining module is arranged to determine that the hydraulic cylinder is at risk of buckling when at least the loading parameter exceeds a buckling threshold.
26. The system according to Para 25, wherein the buckling threshold is a predetermined buckling threshold.
27. The system according to any of Paras 20-26, further comprising:
a cylinder length determining module arranged to determine whether the length of the hydraulic cylinder is above a threshold length; and
wherein the buckling risk determining module is arranged to determine that the hydraulic cylinder is at risk of buckling when (a) it is determined that the length of the hydraulic cylinder is above a threshold length and (b) based on at least the loading parameter.
28. The system according to Para 27, wherein the hydraulic cylinder is a multi-stage hydraulic cylinder, and wherein the cylinder length determining module is arranged to determine that the length of the hydraulic cylinder is above a threshold length when it is determined that the hydraulic cylinder is in the final stage of extension.
29. The system according to Para 27 or 28, wherein the cylinder length determining module is arranged to monitor a length parameter relating to the length of the hydraulic cylinder and is arranged to determine whether the length of the hydraulic cylinder is above a threshold length based on at least the inclination parameter.
30. The system according to Para 29, further comprising an inclination sensor arranged to measure the inclination of the tipper body and generate the length parameter.
31. The system according to Para 30, wherein the inclination sensor is mounted to the tipper body.
32. The system according to Para 29, further comprising an inclination sensor arranged to measure the inclination of the hydraulic cylinder and generate the length parameter.
33. The system according to Para 32, wherein the inclination sensor is arranged to be mounted to the hydraulic cylinder.
34. The system according to any of Paras 20-33, further comprising an alert generator arranged to generate an alert if it is determined that the hydraulic cylinder is at risk of buckling.
35. The system according to Para 34, wherein the alert generator comprises a visual and/or an audible alert generator.
36. The system according to any of Paras 20-35, further comprising a cylinder control module arranged to prevent a tipping operation from being performed if it is determined that the hydraulic cylinder is at risk of buckling.
37. The system according to any of Paras 20-36, further comprising a cylinder control module arranged to automatically halt a tipping operation in response to determining that the hydraulic cylinder is at risk of buckling.
38. The system according to any of Paras 20-37, further comprising a cylinder control module arranged to automatically lower the tipper body in response to determining that the hydraulic cylinder is at risk of buckling.
39. A tipper comprising:
a tipper body pivotably movable with respect to a frame;

a hydraulic cylinder disposed between the frame and the tipper body and actuatable to pivot the tipper body; and
a system in accordance with any of Paras 20-38.

40. A tipper according to Para 39 when appended to Para 23, wherein the pressure sensor is mounted to the hydraulic cylinder.

41. A tipper according to Para 39 or 40 when appended to Para 31, wherein the inclination sensor is mounted to the tipper body.

42. A tipper according to Para 39 or 40 when appended to Para 33, wherein the inclination sensor is mounted to the hydraulic cylinder.

43. A tipper vehicle in accordance with any of Paras 39-42.

That which is claimed:

1. A method of operating a tipper, the tipper comprising a tipper body pivotably moveable with respect to a frame with a hydraulic cylinder disposed therebetween and actuatable to pivot the tipper body, the method comprising:
   commencing a tipping operation by pumping hydraulic fluid into the hydraulic cylinder causing the tipper body to be pivoted towards a tipped position; and
   during the tipping operation:
      (i) monitoring a loading parameter relating to the load through the hydraulic cylinder during the tipping operation;
      (ii) determining that the length of the hydraulic cylinder is above a threshold length;
      (iii) determining that the hydraulic cylinder is at risk of buckling during the tipping operation based on at least the loading parameter and the determination that the length of the hydraulic cylinder is above a threshold length; and
      (iv) generating an output in response to determining that the hydraulic cylinder is at risk of buckling during the tipping operation.

2. The method according to claim 1, wherein the loading parameter is an axial loading parameter relating to the axial load through the hydraulic cylinder.

3. The method according to claim 2, wherein the axial loading parameter is a pressure parameter relating to the hydraulic pressure within the hydraulic cylinder.

4. The method according to claim 1, wherein it is determined that the hydraulic cylinder is at risk of buckling when at least the loading parameter exceeds a buckling threshold.

5. The method according to claim 1, wherein the hydraulic cylinder is a multi-stage hydraulic cylinder, and wherein it is determined that the length of the hydraulic cylinder is above a threshold length when it is determined that the hydraulic cylinder is in the final stage of extension.

6. The method according to claim 1, further comprising monitoring a length parameter relating to the length of the hydraulic cylinder, and wherein it is determined that the length of the hydraulic cylinder is above a threshold length based on at least the length parameter, wherein the length parameter is optionally generated by an inclination sensor which measures: a) the inclination of the tipper body, optionally wherein the inclination sensor is mounted to the tipper body; or b) the inclination of the hydraulic cylinder, optionally wherein the inclination sensor is mounted to the hydraulic cylinder.

7. The method according to claim 1, wherein (iii) comprises one or more of:
   a) generating an alert in response to determining that the hydraulic cylinder is at risk of buckling
   b) preventing a tipping operation from being performed in response to determining that the hydraulic cylinder is at risk of buckling
   c) automatically halting a tipping operation in response to determining that the hydraulic cylinder is at risk of buckling
   d) automatically lowering the tipper body in response to determining that the hydraulic cylinder is at risk of buckling.

8. A system for a tipper comprising a tipper body pivotably moveable with respect to a frame with a hydraulic cylinder disposed therebetween and actuatable to pivot the tipper body, the system comprising:
   a hydraulic cylinder load monitoring module arranged to monitor a loading parameter relating to the load through the hydraulic cylinder during a tipping operation;
   a cylinder length determining module arranged to determine whether the length of the hydraulic cylinder is above a threshold length;
   a buckling risk determining module arranged to:
   determine that the hydraulic cylinder is at risk of buckling during the tipping operation while pumping hydraulic fluid into the hydraulic cylinder when (a) it is determined that the length of the hydraulic cylinder is above a threshold length and (b) based on at least the loading parameter; and
   generate an output if it is determined that the hydraulic cylinder is at risk of buckling during the tipping operation.

9. The system according to claim 8, wherein the loading parameter is an axial loading parameter relating to the axial load through the hydraulic cylinder.

10. The system according to claim 9, wherein the axial loading parameter is a pressure parameter relating to the hydraulic pressure within the hydraulic cylinder.

11. The system according to claim 8, wherein the buckling risk determining module is arranged to determine that the hydraulic cylinder is at risk of buckling when at least the loading parameter exceeds a buckling threshold.

12. The system according to claim 8, further comprising:
   wherein the hydraulic cylinder is a multi-stage hydraulic cylinder, and the cylinder length determining module is arranged to determine that the length of the hydraulic cylinder is above a threshold length when it is determined that the hydraulic cylinder is in the final stage of extension.

13. The system according to claim 8, wherein the cylinder length determining module is arranged to monitor a length parameter relating to the length of the hydraulic cylinder and is arranged to determine whether the length of the hydraulic cylinder is above a threshold length based on at least the length parameter.

14. The system according to claim 13, further comprising an inclination sensor arranged to measure the inclination of the tipper body and generate the length parameter.

15. The system according to claim 13, further comprising an inclination sensor arranged to measure the inclination of the hydraulic cylinder and generate the length parameter, wherein the inclination sensor is optionally arranged to be mounted to the hydraulic cylinder.

16. The system according to claim 8, further comprising one or more of:
   a) an alert generator arranged to generate an alert if it is determined that the hydraulic cylinder is at risk of buckling
   b) a cylinder control module arranged to prevent a tipping operation from being performed if it is determined that the hydraulic cylinder is at risk of buckling c) a cylinder control module arranged to automatically halt a tipping operation in response to determining that the hydraulic cylinder is at risk of buckling d) a cylinder control module arranged to automatically lower the tipper body in response to determining that the hydraulic cylinder is at risk of buckling.

17. A tipper comprising:

a tipper body pivotably moveable with respect to a frame;

a hydraulic cylinder disposed between the frame and the tipper body and actuatable to pivot the tipper body; and a system in accordance with claim 8.

18. A tipper vehicle in accordance with claim 17.

19. The method according to claim 3, wherein the pressure parameter is generated by a pressure sensor which measures the hydraulic pressure within the hydraulic cylinder, and wherein the pressure sensor is mounted to the hydraulic cylinder.

\* \* \* \* \*